Aug. 21, 1923.

J. A. BOWDEN 1,465,726

SELF REGISTERING PRESSURE GAUGE

Original Filed July 27, 1910

WITNESS:

René Ffrine

INVENTOR :
Junius A. Bowden,

By Attorneys,

Patented Aug. 21, 1923.

1,465,726

UNITED STATES PATENT OFFICE.

JUNIUS A. BOWDEN, OF LOS ANGELES, CALIFORNIA, ASSIGNOR TO A. SCHRADER'S SON, INC., OF BROOKLYN, NEW YORK, A CORPORATION OF NEW YORK.

SELF-REGISTERING PRESSURE GAUGE.

Original application filed July 27, 1910, Serial No. 574,177. Divided and this application filed June 26, 1919. Serial No. 306,930.

*To all whom it may concern:*

Be it known that I, JUNIUS A. BOWDEN, a citizen of the United States of America, residing at Los Angeles, in the county of Los Angeles and State of California, have invented a new and useful Improvement in Self-Registering Pressure Gauges, of which the following is a specification.

This application is a division of my application filed July 27, 1910, Serial No. 574,177.

This invention relates to pressure gauges for determining the air pressure in pneumatic tires, and one of the main objects of the invention is to so construct the gauge that after it has received the air pressure of the tire, the amount of such pressure will be registered on the gauge, and such registration will remain even after the gauge is removed from communication with the air pressure of the tire, whereby the amount of pressure indicated on the gauge may be readily inspected by removing the gauge from the tire and holding it in a more convenient and favorable position than is possible when it is on the tire. The tire valve to which the gauge is applied may be located in many different positions according to the position in which the wheel may lie, the air valve often lying in such a position that it is necessary to apply the gauge upside down, and it is very inconvenient and difficult to read the pressure while the gauge is in such position. Again the wheel may be in such a situation that the light is dim, or in applying the gauge in the dark where the gauge must be read when applied to the tire, it is necessary to bring a light to the gauge in order to read it, all of which difficulties are avoided with the present invention, as it may be easily applied to the valve in order to receive the air pressure without necessitating the use of a light, this operation being easily accomplished by touch, and after the air has entered the gauge and operated the same, the gauge may be readily removed and carried to the light on the vehicle and the pressure easily read. Furthermore, as the pressure is registered by the gauge, such registration will be maintained until it has been changed by the operator. As much time may be consumed in reading the registration as is desired, while when the gauge must be read when on the tire, only a short time is generally available, owing to the great inconvenience in bending over and properly holding the gauge in the correct position long enough to make the reading. Another advantage is that only a momentary perfect connection need be made between the gauge and the valve of the tire, as the gauge will register the highest point of actual air pressure upon perfect communication being made, even if only momentary, and will not return to a lower point, while in that type of gauge which must be read when applied to the tire, it often happens that when at the moment of reading the gauge, the gauge may have been inadvertently displaced from perfect communication with the valve, in which event a less pressure will be registered at the moment of reading the gauge than is actually in the tire.

Figure 1:
Figure 1 is a side elevation of one form of gauge.
Figure 2:
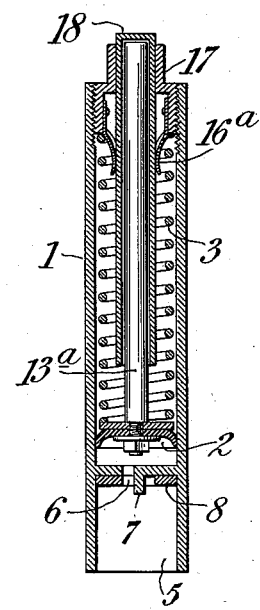
Fig. 2 is a longitudinal section of Fig. 1.
Figure 3:
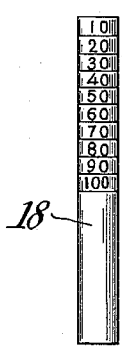
Fig. 3 is a side elevation in detail of the gauge bar in Fig. 1.
Figure 4:
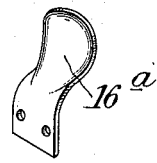
Fig. 4 is a detail of one of the spring fingers shown in Fig. 2.

The gauge comprises an air cylinder 1 in which there is a pressure responsive member comprising a piston 2, a spring 3 bearing against the upper side of the piston 2, and a rod $13^a$ or the like extending from the piston. The upper end of the spring bears against a hollow nut 17 which is screwed in the upper end of the air cylinder 1. The lower end of the air cylinder is provided with a hollow extension 5 which communicates with the interior of the air cylinder 1 through port 6, there being a stud 7 projecting down from the lower part of the air cylinder 1 which is adapted for pressing open the stem of the air valve of the tire when the gauge is applied thereto, to permit air to pass from the valve of the tire through the port 6 into the air cylinder 1 below the piston 2. In order to make an air-tight connection between the pressure gauge and the air valve I provide a packing 8 of rubber or other material arranged in the lower part of the hollow extension 5. The purpose of the hollow extension 5 is to guide the air gauge when being moved into position over the air valve, and to maintain the air gauge in proper alinement with the air valve after it has been applied thereto, preventing the gauge from slipping off, The registering device 18 comprises a small tube which slides through the nut 17 and over the piston rod 13$^a$, spring fingers 16$^a$ bearing against the registering device 18. As the piston rod 13$^a$ is moved out by the piston, it moves out the registering device 18, and the latter having numerals on its outer surface, as shown in Figs. 1 and 3, denotes the air pressure. The spring finger 16$^a$ retains the registering device 18 in a position into which it is moved until it is restored manually.

The tension of the spring 3 may be adjusted by moving the hollow nut 17 at the end of the casing longitudinally.

In operation after the gauge is pressed upon the tire valve, the projection 7 unseating the latter, the air entering the cylinder 1 forces up the piston 2, and the piston rod 13 acting against the closed end of the tubes 18 will slide the latter outwardly as far as the air pressure pushes the piston 2. The friction of the spring finger 16$^a$ is not sufficient to exert any appreciable resistance to the air pressure, it only being enough to carry the weight of the tube 18, which is very light. The object of the spring fingers is to prevent the return of the tube after the air pressure has been removed from the piston, and the piston and piston rod have been returned by the spring to their normal position, the spring fingers acting to maintain the registering tube in the position into which it has been moved by the piston rod, and to permit the registering tube to be readily pushed back by hand at any time after the gauge has been read.

While I have shown and described one form of the invention, it will be understood that I do not wish to be limited thereto, since various changes may be made therein without departing from the scope of the invention.

What I claim is:—

1. A pressure gauge for tires, comprising a casing, having an indicator opening, a pressure-responsive member comprising a piston in the casing and a coiled spring pressing upon the upper side of said piston, and an indicator element separate from said piston and adapted to be pressed through said indicator opening by said pressure-responsive member for indicating pressures, said indicator element being adapted to project within said coiled spring.

2. A pressure gauge for tires, comprising a casing having an indicator opening, a pressure-responsive member comprising a piston movable in said casing, and a spring pressing downwardly on said piston, a tubular gauge member within said casing and moved by the said pressure responsive member, said tubular gauge member being arranged within said spring, and means for holding said tubular gauge member in registering position after retraction of said piston.

3. A pressure gauge for tires, comprising a casing having an indicator opening, a pressure-responsive member comprising a piston movable in said casing and a spring pressing downwardly on said piston, a tubular gauge member within said casing and moved by the said pressure-responsive member, said tubular gauge member being arranged within said spring, and frictional means for holding said tubular gauge member in registering position after retraction of said piston.

4. A pressure gauge for tires, comprising a casing having an indicator opening, a pressure-responsive member comprising a piston movable in said casing, a spring, and a piston rod carried by the said piston, a tubular gauge member adapted to be operated by said pressure responsive member arranged within said casing and projecting outward through the indicator opening, said tubular gauge member being arranged within said spring and exteriorly of said piston rod, and means for holding said gauge member in registering position after the gauge has been removed from the tire valve.

In witness whereof, I have hereunto signed my name.

JUNIUS A. BOWDEN.